(12) United States Patent
Wilson

(10) Patent No.: US 7,250,067 B2
(45) Date of Patent: Jul. 31, 2007

(54) GAS AND ODOUR TREATMENT

(75) Inventor: Ashley John Wilson, York (GB)

(73) Assignee: Carafiltration Limited, York (GB)

( * ) Notice: Subject to any disclaimer, the term of this patent is extended or adjusted under 35 U.S.C. 154(b) by 192 days.

(21) Appl. No.: 10/486,619

(22) PCT Filed: Aug. 16, 2002

(86) PCT No.: PCT/GB02/03789

§ 371 (c)(1),
(2), (4) Date: Jul. 8, 2004

(87) PCT Pub. No.: WO03/015898

PCT Pub. Date: Feb. 27, 2003

(65) Prior Publication Data

US 2004/0237784 A1 Dec. 2, 2004

(30) Foreign Application Priority Data

Aug. 17, 2001 (GB) ................................. 0120085.6

(51) Int. Cl.
*C02F 1/28* (2006.01)
*C02F 1/52* (2006.01)
(52) U.S. Cl. .......................... 55/512; 55/522; 55/524; 55/529; 96/290; 210/688; 210/728; 210/912; 210/913; 261/DIG. 72
(58) Field of Classification Search .................. 55/512, 55/524, 522, 529; 96/290; 210/688, 728, 210/912, 913; 261/DIG. 72
See application file for complete search history.

(56) References Cited

U.S. PATENT DOCUMENTS 2,040,879 A * 5/1936 Rigby ........................... 536/20
3,533,940 A * 10/1970 Johnson et al. ............. 210/728
4,977,090 A   12/1990 Hutterman et al.
5,010,181 A *  4/1991 Coughlin ....................... 536/20
6,019,810 A *  2/2000 Phillips et al. ................. 55/512
6,264,841 B1   7/2001 Tudor
2004/0167019 A1* 8/2004 Liang et al. ................. 502/433

FOREIGN PATENT DOCUMENTS

| EP | 0573666 | 12/1992 |
| GB | 2354234 | 3/2001 |
| JP | 63049230 | 3/1988 |
| KR | 100275790 | 9/2000 |

OTHER PUBLICATIONS

Great Britain Search Report corresponding to GB 0120085.6. Mailed on Jan. 28, 2002.
International Search Report corresponding to PCT/GB02/03789. Mailed on Feb. 14, 2003.
Park, et al. "Evaluation of Natural Crab Shell as an Adsorbent for Preconcentrating Airborne Volatile Organic Compounds Collected in a Canister." *Journal of Chromatograpy* 829:215-221 (1998).

* cited by examiner

*Primary Examiner*—Duane Smith
*Assistant Examiner*—Minh-Chau T. Pham
(74) *Attorney, Agent, or Firm*—Myers Bigel Sibley & Sajovec, PA

(57) ABSTRACT

The present invention relates to a product for, and a method of, treating gases, fumes and vapors with fragments of crustacean shell so as to extract one or more components/pollutants from the gases.

17 Claims, 5 Drawing Sheets

GAS AND ODOUR TREATMENT

CROSS-REFERENCE TO RELATED APPLICATIONS

The present application is a 35 U.S.C. § 371 National Phase Application of International Application Ser. No. PCT/GB02/03789, filed Aug. 16, 2002, which claims priority to Great Britain Patent Application Ser. No. 0120085.6, filed Aug. 17, 2001, the disclosures of which are incorporated herein by reference in their entireties.

FIELD OF THE INVENTION

The present invention relates to a product for, and an improved method of, treating gases, fumes and vapors so as to extract components therefrom, and is of particular but not exclusive use in the treatment of gaseous effluent from industrial/agricultural processes.

BACKGROUND OF THE INVENTION

Cleaning or decontaminating of effluent gases, as opposed to cleaning or contaminating effluent liquids present a unique problem to the environment.

A variety of bioadsorbents have been employed over the years for the treatment of gases to either detoxify or reduce their odor. The types of molecules removed are generally related to the functionalized biopolymers from which the bioadsorbent is composed. These bioadsorbants include, cellulose, alginates, chitin, chitosan and carrageenan. In addition 'activated' microporous materials such as activated carbon, activated silica and molecular sieves have also been used.

A problem associated with the use of purified extracts for gas treatment lies not only in the cost of extraction but in their efficacy.

It is known from the prior art to "scrub" volatile zinc fumes produced from hot dip galvanizing plants by using crushed limestone. The crushed limestone is allowed to contact the zinc fumes in a filter bag arrangement so as to bind the zinc, thereafter the bound zinc/limestone is disposed of However, a problem with this method of scrubbing metal fumes is that not all of the metal becomes bound to the limestone. Moreover the bound metal is not easily recoverable from the limestone and the bound product in itself is difficult to dispose of.

The present invention provides an alternative bioadsorbant material and a method of producing and using it which is not only more cost effective than prior art material but is more efficient at extracting component(s)/pollutants from the fumes/gas vapors.

STATEMENTS OF INVENTION

The present invention resides in the observation that un-denatured crustacean shell fragments are efficient at treating gas effluents so as to remove/bind component(s) pollutant(s) from a gas flow.

According to the present invention there is provided a method of preparing shells for the treatment of a gaseous composition to extract therefrom one or more components thereof, the method comprising the steps of:
(i) clearing a crustacean shell so as to be free of soft tissue;
(ii) fragmenting the shell; by means of a high shear shredder milling;
(iii) sieving the fragmented shell and;
(iv) placing the sieved fragments in a vessel through which a gaseous composition is able to flow, and wherein the sieved fragments are either static or are fluidized in the gas flow.

Preferably, fragmentation of the shell is by means of a high sheaf shredder milling.

Preparation of the shell for use in the method of the invention is a multi-stage process. Preferably, the whole shell is cleaned free from adherent biological soft tissue prior to fragmentation. This may be achieved preferably by high pressure hosing followed by ultrasonic cleaning for example for about 30 minutes. Preferably the whole shell is then washed with fresh water and subsequently air-dried at a temperature which does not denature the biochemistry of the shell.

It may also be applicable to use a chemical method of clearing the shell of soft tissue as long as the shell remains un-denatured by such a treatment step.

Preferably, the shell is then fragmented, for example, by means of a high shear shredder. Typically each fragment will have front and rear surfaces derived from the largest outer and inner surfaces of the shell from which it formed a part, interconnected by side surfaces of smaller surface area. Preferably the surface area of the largest side of each fragment is from 10 to 20 $mm^2$ More preferably, the surface area of the largest side of each fragment is about 15 $mm^2$.

In one embodiment of the invention the shell is frozen. The frozen shell fragments are then passed through a high shear mill or a pin mill (cryogenic milling).

We have found that cyogenic milling does not have any deleterious effect on the biochemical and/or physical properties of the shell.

Preferably, milled powder is sieved through a screen suitably fitted with a pore size in the range of 100 to 600 $\mu m$, and ideally is 120 to 550 $\mu m$ and most ideally is 480 $\mu m$. Larger pieces excluded by the screen may be re-milled to the correct particle size range and re-sieved. The size of the shell particles ideally makes a fine powder of 120 to 480 $\mu m$ with a high surface area to volume ratio which improves the efficacy of the extraction process. We have found that particle size is an important determinant of efficiency. Whilst it is desirable to have a large surface area to volume ratio for the particles, we have found that particles below a certain size surprisingly loose their ability to absorb gases presumably due to structural damage during milling. We have also found that particles above a certain size although maintaining their physical integrity have a decreased efficiency due to a low surface area to volume ratio.

We have found that crustacean shell is an effective absorbent by virtue of the chemistry/biochemistry present within its structure and that the principle mechanism of binding in the absorbent shell fragments is chemisorption.

Preferably, the crustacean shell used in the method of the present invention is derived from a crab, prawn, langoustine or lobster and more preferably the invention involves the use of crab carapace.

Reference herein to fragmentation of the shell is intended to include a powder, part of the shell in particulate form or discrete particles thereof.

Reference herein to carapace is intended to include part of a whole carpace, for example, the shell body, arms, legs, claws, tail and/or any other body part, or portion thereof, of a crustacean from which soft tissue can be removed.

Preferably, the crustacean is mature so that, in the instance of using a crab or lobster, at least a part of its carapace is mineralized with calcium carbonate deposits. The shells of prawns and langoustines are primarily composed of chitin and even when they are mature the shells are not always mineralized. However, mature carapaces from any one of the selected crustacean perform the function of the present invention.

Other prior art methods of preparing crustacean shells have employed steps of subjecting the shell fragments to extended periods of high temperature for example 12 hours at 160° C. or 1 hr at 200° C. and similar conditions to effect desorption. However such a step denatures the shell fragments so that it can only, function as a physiosorptive trap. We have found that un-denatured shell retains chemisorption properties which enhance the overall cleaning/extraction performance.

According to a yet further aspect of the invention there is provided a product comprising crustacean shell fragments of a pore size up to 500 μm for use in treating gaseous compositions so as to remove a component of pollutant therefrom.

Preferably, the product is produced by the method of the present invention.

Preferably, the product is of substantially uniform particle size.

According to a yet further aspect of the invention there is provided an apparatus for the treatment of gaseous effluents comprising:
 (i) a container in which adsorbent material is located the container being provided with entry and exit ports for the passage of a gaseous composition therethrough and;
 (ii) an adsorbent material carrier in the container.

Preferably the adsorbent material is fragmented shell.

Preferably, the adsorbent material carrier is an up-flow column. In this embodiment of the invention fragmented shell is, suitably contained within a packed-bed contactor and effluent gas is forced through the column so that it contacts the fragmented shell (FIGS. 4 and 5).

In another embodiment of the invention the adsorbent material carrier is a bag filter. In this embodiment, the adsorbent material may be coated on to and trapped on the surface of a coarsely woven porous bag. Effluent gas is forced through the bag filter thereby having contact with the absorbent material.

In order to maintain efficacy it is preferable that a container in which the adsorbent material is located allows maximum opportunity for contact of the gas, for example industrial exhaust gas, with the micro-porous adsorbent, while at the same time maintaining the residence time at a minimum in order to facilitate good flow rates. A packed-bed design of contactor or a bag filter will facilitate this.

Preferably the apparatus uses the product of the present invention.

According to a yet further aspect of the invention there is provided a method of treating a gaseous composition to extract therefrom one or more components thereof, the method comprising contacting the gaseous composition with fragmented shell, or part shell as hereinbefore defined, of a crustacean, said one or more components having a binding affinity with said shell, and separating said shell from said gaseous composition.

The flow rates and residence (contact) times are variable and depend on the industrial process in which the powdered shell is employed, the scale of cleaning/scrubbing of gas effluence required and the concentration of contaminants within the gaseous effluence.

Preferably, the fragmented shell is prepared as hereinbefore described and may be used with the apparatus as hereinbefore described.

Preferably, volatile and-fine particulate materials are removed from the gaseous composition by binding to the powdered shell fragments by both physiological (physioabsorptive) and chemical (chemisorptive) binding. In this way gaseous effluents may be scrubbed/cleaned of undesirable contaminants.

According to a further aspect of the invention there is provided use of fragmented crustacean shell in removing volatile zinc copper, nickel, cadmium or lead from industrial gaseous effluent.

According to a yet further aspect of the invention there is provided use of fragmented crustacean shell in the removal of acidic or sulphur based gases from industrial effluent.

Preferably the acidic gases include acetic acid, hydrochloric acid and nitric acid which are by-products of a number of industrial processes such as galvanization and in the manufacture of printed circuit boards. In addition the use may be for the removal of acidic gases such as sulphur dioxide and hydrogen peroxide and sulphur based gases such as carbonyl sulphate, dimethyl sulphate, carbon disulphide, dimethyl disulphide, dimethyl trisulphide, thiols and mercaptans from a range of industrial and also biological anaerobic processes.

Preferably, the fragmented shell is prepared as hereinbefore described for the various uses and the shell fragments may be used with the apparatus as hereinbefore described.

The invention will now be described by way of example only with reference to the following Figures wherein.

DETAILED DESCRIPTION OF TE INVENTION

Figure 1:
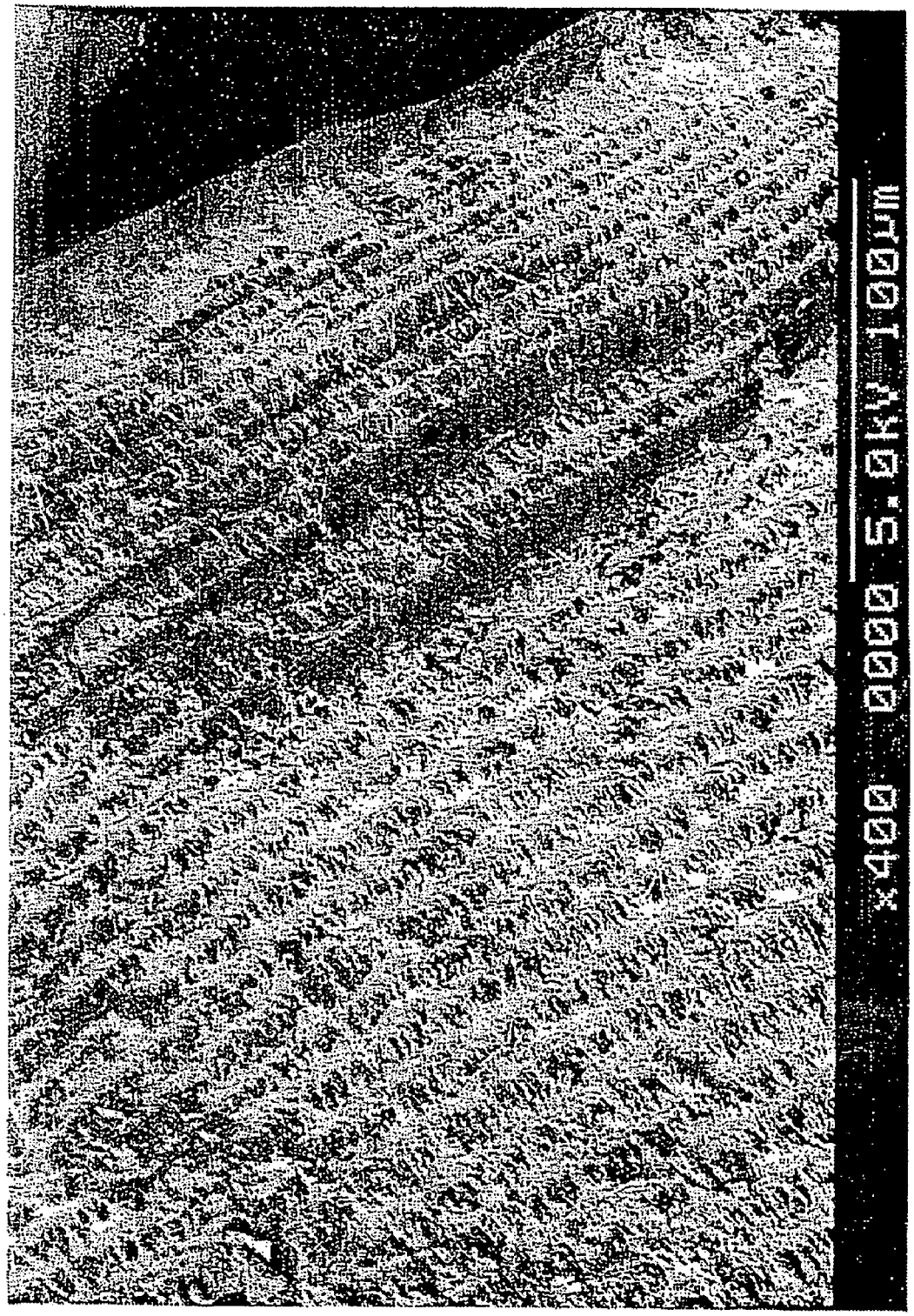
FIG. 1 illustrates an electron micrograph of a crab carapace.
Figure 2:
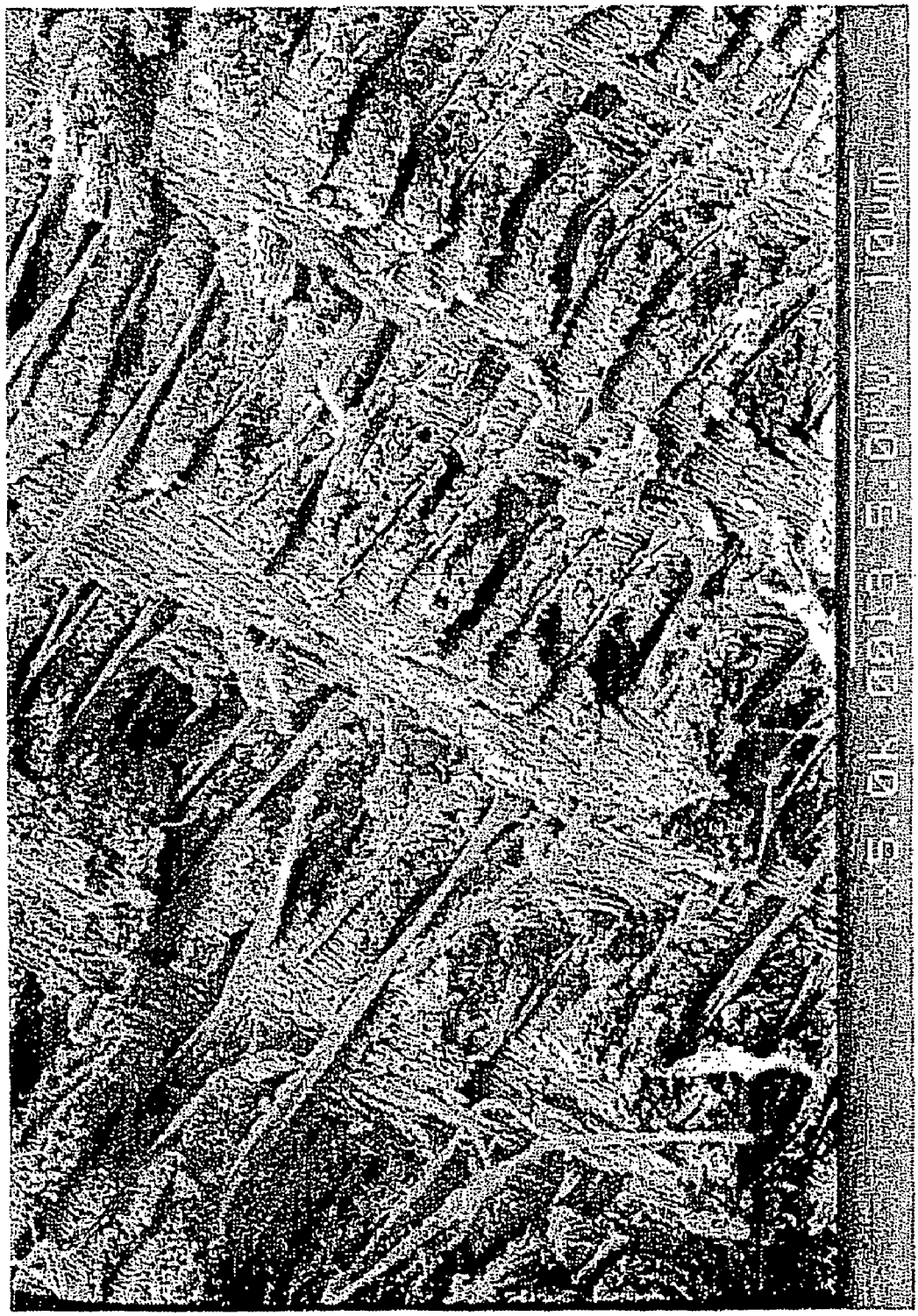
FIG. 2 represents an alternative view of FIG. 1.
Figure 3:
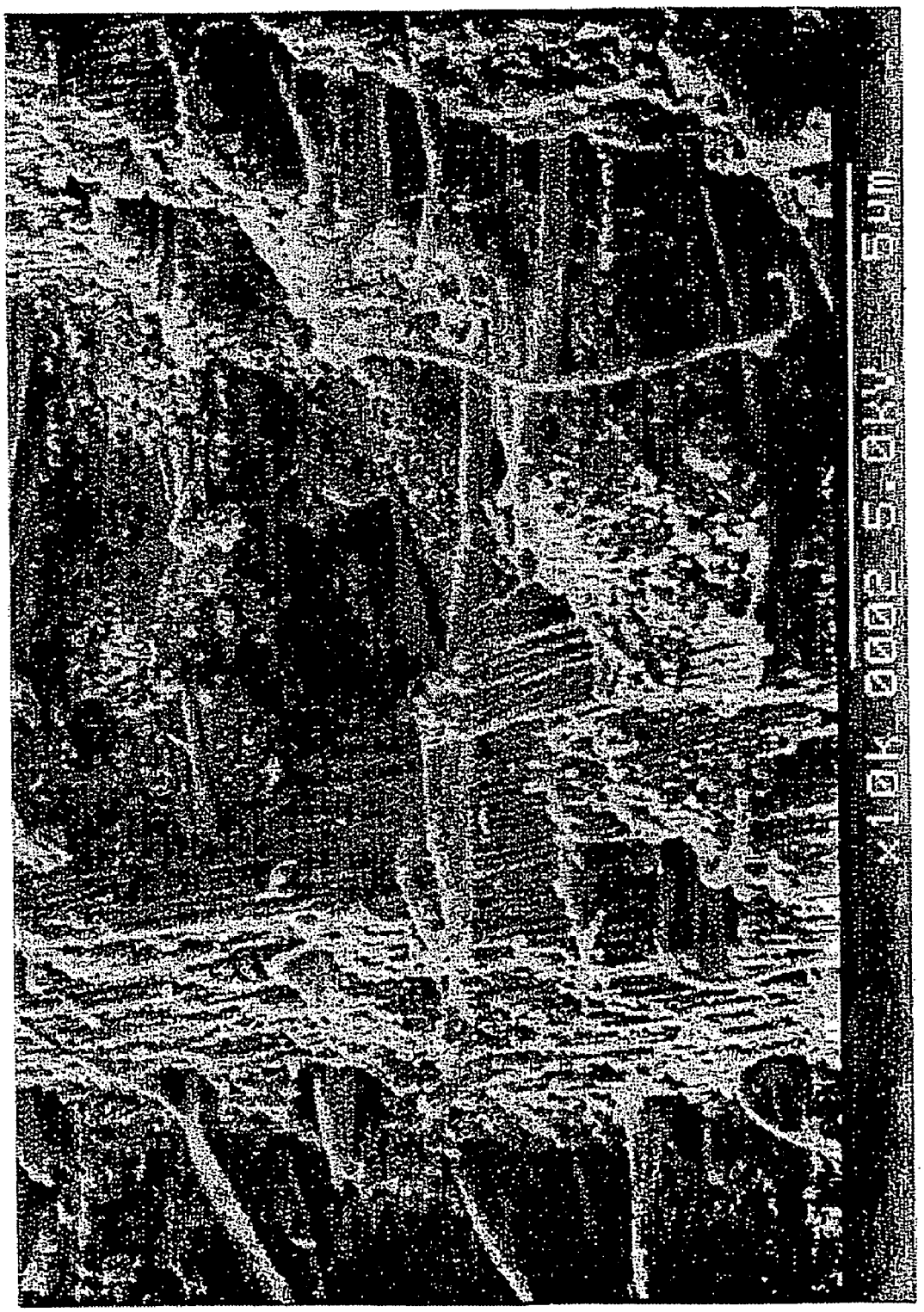
FIG. 3 represents an alternative view of FIGS. 1 and 2.

The high binding capacity of the crab carapace is partly due to the inherently microporous nature of the material (similar to activated carbon and silica) and the large surface area to volume ration which results. The carapace has a micro-porous "box-girder" form of construction in order to provide maximum mechanical rigidity for minimum density (FIGS. 1-3). Conversion of the carapace into an adsorbent is achieved by turning shell, for example by milling, into fragments, thereby providing a further increase in surface area for chemisorption and physisorption.

This present invention describes the optimum particle size of about 480 μm which will enclose pores providing a maximum flow rate of gas while providing a retention time optimum to the provision of maximum binding.

The extensive internal surface of the carapace consists of a network of organic and inorganic components. Organic polymers (chitin and fibrous proteins) are wrapped in globular protein and cemented in inorganic calcium carbonate (Hegdahl et al 1977 a & b).

The positively-charged amine side-groups of the principally globular but also fibrous proteins, readily bind a variety of contaminating molecules found in industrial exhaust gases. In addition there-will be some physisorption of molecules by electrostatic, van der Waals' forces.

Figure 5:
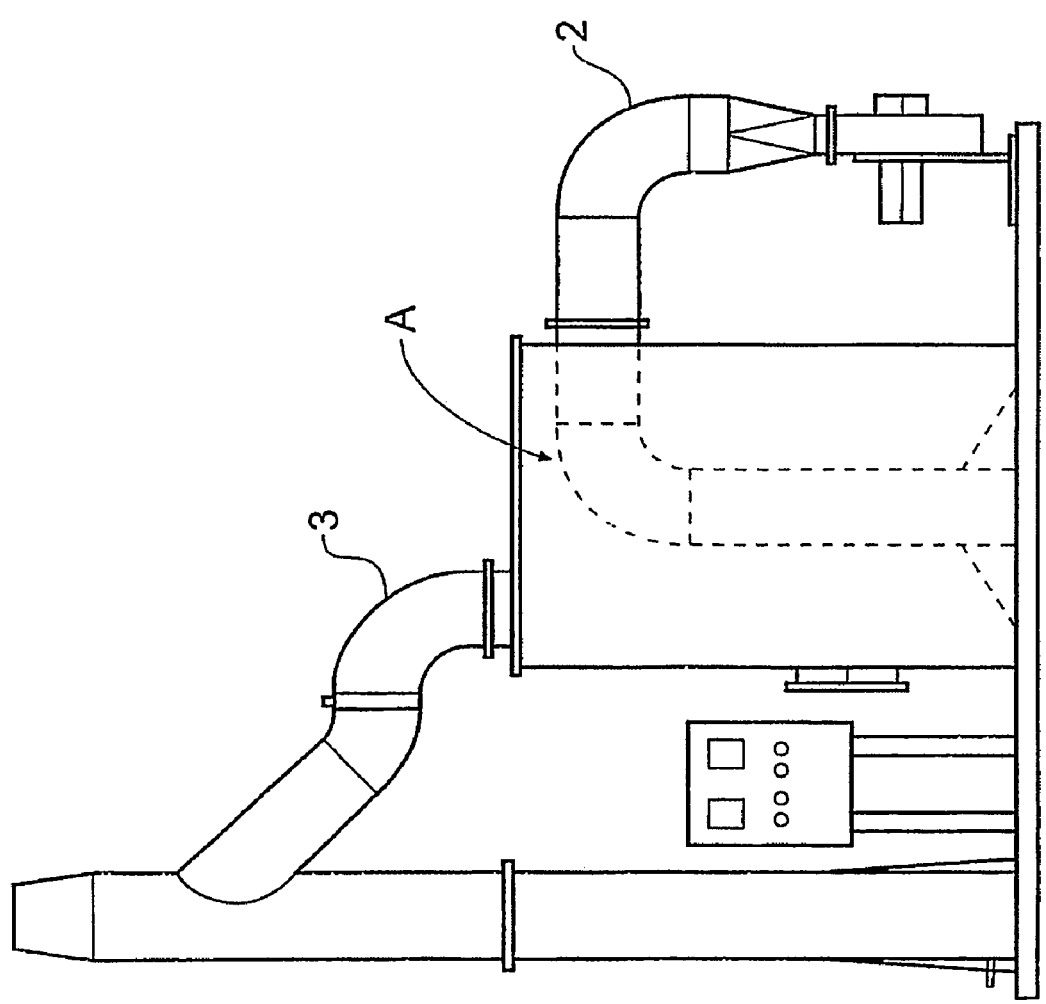
FIG. 5 represents a modification of the apparatus illustrated in FIG. 4 for contacting carapace with gaseous effluent with improved efficiency of contact.

With reference to FIG. 5 there is shown the apparatus of the present invention in block diagram form. The apparatus A comprises a container 1 with an inlet port 2 and an outlet port 3 for effluent gas to flow therethrough in the direction of arrows 5 to 6.

The apparatus further comprises an adsorbent material carrier 7. The carrier can be in the form of a packed bed contactor or a filter bag arrangement enclosing powdered crab carapace 8. The container is also provided with a drain 9. In operation, gas effluence is passed to the container via inlet port 3 and into the space 10 defined by walls of the adsorbent material carrier 7. Effluent gas then passes in direction of arrows 11 and through the carrier 7 so that the gas passes over the powdered crab carapace contained within walls of the carrier, in this way materials such as zinc can be trapped on the powder.

Figure 4:
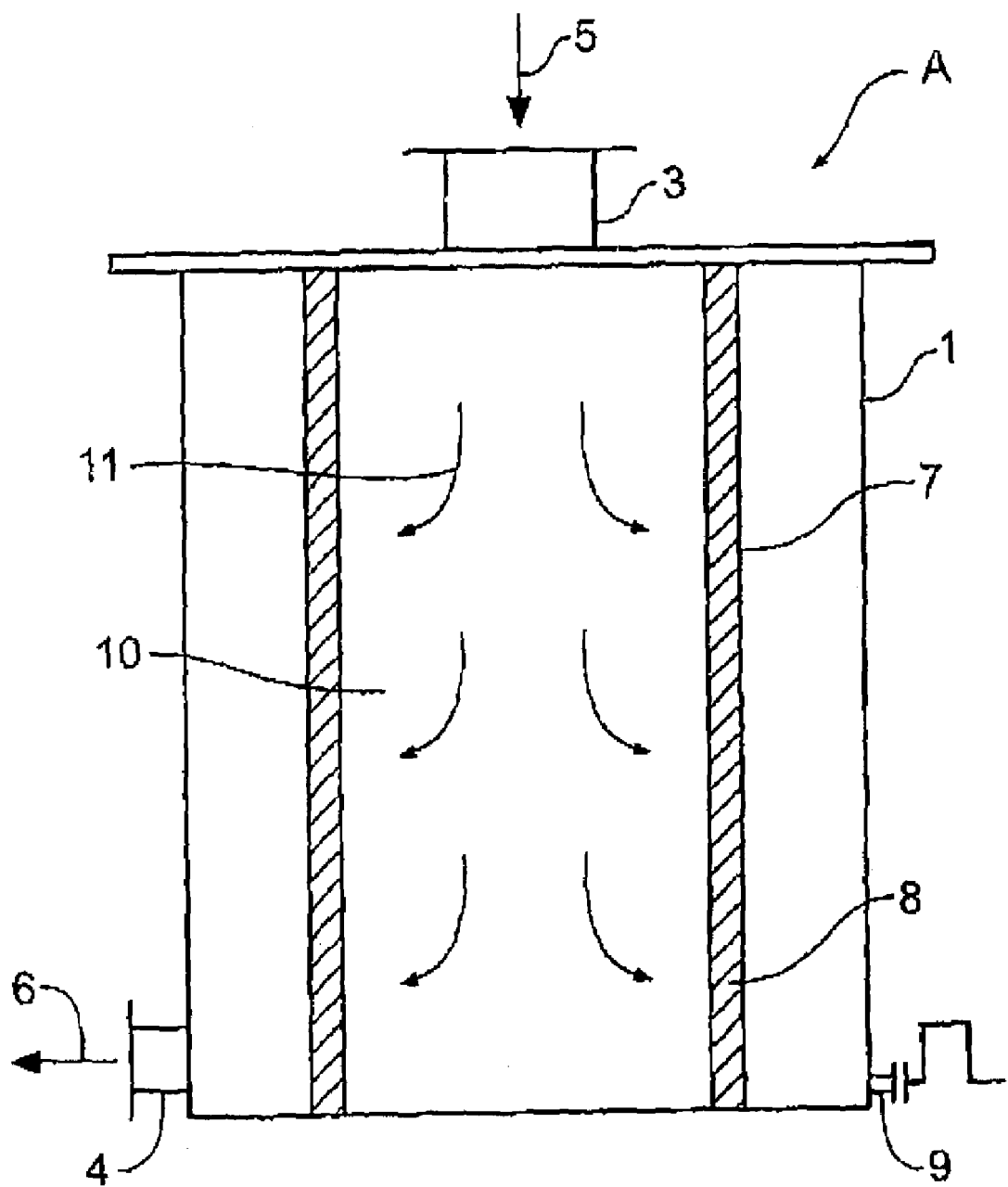
FIG. 4 represents the apparatus of the present invention in situ for scrubbing gases and colors.

With reference to FIG. 4 there is shown the apparatus of the present invention used for scrubbing gases and odors.

The technology of the present invention provides numerous advantages over pre-existing methods of gaseous effluent treatment. It is highly cost effective since the raw material is provided annually as a waste product and actually attracts a cost for disposal in landfill sites or disposal at sea. The subsequent processing into a bioadsorbent is comparatively inexpensive. It is estimated that the present invention advantageously could reduce cost by as much as 20 times the current practice cost.

Although the retention capacity of the adsorbent varies depending on the molecule being bound within its structure, the crab shell adsorbent also has a very high binding capacity.

Disposal of the spent bioadsorbent used to trap acid gases and odors may by via landfill or incineration. When subjected to composting or when ploughed into arable land, the biochemical components of the milled carapace (protein and chitin) denature within a few weeks. However, in the case of carapace used to trap volatile zinc, the zinc-saturated carapace is sent to a zinc smelter/refiner where it is mixed with zinc ore (zinc sulphide) and where zinc metal is recovered. Calcium carbonate, the principal mineral component of carapace, is biocompatible. Depending on the pH of the soil, it will either disappear after several months or be retained within the soil for more prolonged periods, where it will then serve as a valuable calcium fertilizer.

It is envisaged that the present invention will have wide-ranging applications in the treatment of gaseous effluents produced from a variety of industrial/agricultural processes. These include:

(i) Removal of volatile zinc from the gaseous effluent of galvanizing plants, and volative cadmium and lead from other industrial processes.

(ii) Removal of acid gases such as acetic, hydrochloric and nitric acid used in a variety of industrial processes such as galvanization and manufacture of printed circuit boards.

(iii) Removal of acidic gases such as sulphur dioxide carbonyl sulphide, dimethyl sulphide, carbon disulphide, dimethyl disulphide, dimethyl trisulphide and hydrogen sulphide from a range of industrial and also biological anaerobic processes.

(iv) Removal of molecules causing malodour and sulphur-based gases such as thiols and mercaptans.

EXAMPLE 1

Milled crab carapace powder, sieved through a screen with a pore size of 120 μm was placed in an adsorbent material carrier as depicted in FIGS. 4 and 5. A similar arrangement was provided with conventional powdered limestone adsorbent material carrier. Each apparatus contained 25 Kg of adsorbent material and gaseous effluent from a zinc galvanizing plant was allowed to pass through the apparatus for 177 hours each. This time being typical for a production run when the plant is operational.

At the end of the run, samples from each adsorbent were taken and the percentage of zinc was determined using an inductively coupled plasma analytical technique. The comparative results are tabulated below:

| Parameter | Crab Carapace | Limestone |
| --- | --- | --- |
| Percentage trapped Zinc | 27.28% | 10.47% |
| Weight of trapped Zinc | 6.82 Kg | 2.62 Kg |
| Trapping Rate | 38.53 gm/hour | 14.80 gm/hour |

The results show that powdered crab carapace is more effective than conventional powdered limestone at trapping zinc from galvanizing plant effluent.

EXAMPLE 2

In a study with milled powdered crab carapace run over a 10 hour production time, the following additional metals were found to be trapped in the carapace bioadsorbent: zinc (11,557 ppm); lead (456 ppm); copper (23.8 ppm); nickel (11.7 ppm) and cadmium (7.2 ppm).

These results show that powdered crab carapace is effective at removing a variety of metals from gaseous effluence.

EXAMPLE 3

Crab carapace, powder of 120 μm (Carasol 120) was found to have a surface area of 9.1 $m^2/g$. Crab carapace powder of 480 μm (Carasol 480) was found to have a surface area of 18.2 $m^2/g$. These results shows that particle size of approximately 0.5 mm has a higher surface area to volume ratio than smaller fine powder and that it is a suitable candidate for extracting contaminants from effluent gases and may be used in cleaning/purifying gases and industrial effluence. Further results have shown that carapace powder of greater particle size than Carasol 480 have a reduced surface area to volume ratio which indicates that particle size is an important determinant in efficacy.

REFERENCES

Hegdahl, T. Gutstavesen, F. & Silness, J. (1977). The structure and mineralization of the carapace of the Crab (Cancer pagulus) 2. The exocuticle. Zoologica Scripta Vol. 6. pp 101-105.

The invention claimed is:

1. A method of preparing shells for the treatment of a gaseous composition to extract therefrom one or more components thereof, the method comprising the steps of:
   (i) clearing a crustacean shell so as to be free of soft tissue but remaining un-denatured;
   (ii) fragmenting the shell to produce a powder;
   (iii) sieving the shell powder through a screen and;
   (iv) placing the sieved powder in a vessel through which a gaseous composition is able to flow, and wherein the sieved powder is either static or fluidised in the gas flow.

2. A method according to 1 wherein clearing the shell comprises hosing the shell by high pressure followed by applying ultrasonic cleaning.

3. A method according to claim 2 wherein the ultrasonic cleaning is applied for about 30 minutes.

4. A method according to claim 1, wherein step (i) further comprises washing the whole shell with water and subsequently air-drying the shell.

5. A method according to claim 1, wherein the shell powder produced by step (ii) results in particles with a surface area of about 10 to 20 mm$^2$.

6. A method according to claim 5 wherein the particles have a surface area of about 15 mm$^2$.

7. A method according to claim 1, further comprising sieving the powder through a screen with a pore size in the range 100 to 600 μm.

8. A method according to claim 7 wherein the pore size is in the range 120 to 550 μm.

9. A method according to claim 7, wherein the pore size is approximately 480 μm.

10. A method according to claim 1, wherein the crustacean is selected from the group comprising crab, prawn, langoustine or lobster.

11. A method according to claim 1, further comprising freezing the shell prior to fragmentation and then milling the shell under cryogenic conditions.

12. A product comprising powdered Un-denatured crustacean shells of pore size up to 500 μm for use in treating gaseous compositions so as to extract a component or pollutant therefrom.

13. A method of treating a gaseous composition to extract therefrom one or more components thereof, the method comprising contacting the gaseous composition with powdered un-denatured shell, or part shell, of a crustacean, said one or more components having a binding affinity with said powdered shell, and separating said powdered shell from said gaseous composition.

14. A method of removing volatile zinc, copper, nickel, cadmium or lead from industrial gaseous effluent through a powdered un-denatured crustacean shell.

15. A method of removing acidic gases or sulphur based gases from industrial effluence through a powdered un-denatured crustacean shell.

16. The method according to claim 14 wherein the powdered un-denatured crustacean shell is prepared by clearing a crustacean shell so as to be free of soft tissue but remaining un-denatured, fragmenting the shell to produce a powder, sieving the powder, and placing the sieved powder in a vessel through which a gaseous composition is able to flow, and wherein the sieved powder is either static or fluidized in the gas flow.

17. The method according to claim 15 wherein the powdered un-denatured crustacean shell is prepared by clearing a crustacean shell so as to be free of soft tissue but remaining un-denatured, fragmenting the shell to produce a powder, sieving the powder, and placing the sieved powder in a vessel through which a gaseous composition is able to flow, and wherein the sieved powder is either static or fluidized in the gas flow.

* * * * *